(12) United States Patent
Petersen et al.

(10) Patent No.: US 9,577,544 B2
(45) Date of Patent: Feb. 21, 2017

(54) DEVICE AND METHOD FOR CONNECTING AN ELECTRIC POWER GENERATOR TO AN HVDC TRANSMISSION SYSTEM

(71) Applicant: Siemens Aktiengesellschaft, Munich (DE)

(72) Inventors: Jesper Elliot Petersen, Olgod (DK); Arwyn Thomas, Cheshire (GB); Zhan-Yuan Wu, Sheffield (GB); Zhen Ping Xia, Sheffield (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 13 days.

(21) Appl. No.: 14/710,069

(22) Filed: May 12, 2015

(65) Prior Publication Data
US 2015/0349655 A1    Dec. 3, 2015

(30) Foreign Application Priority Data
Jun. 2, 2014  (EP) ................................ 14170792

(51) Int. Cl.
*H02J 3/36* (2006.01)
*H02M 5/458* (2006.01)

(52) U.S. Cl.
CPC ............. *H02M 5/458* (2013.01); *H02J 3/36* (2013.01); *H02J 2003/365* (2013.01); *Y02E 10/76* (2013.01); *Y02E 60/60* (2013.01)

(58) Field of Classification Search
CPC ........................................................ H02J 3/36
USPC ........... 363/35, 37, 44–46, 51–53, 125–127; 322/28, 29; 307/82
See application file for complete search history.

(56) References Cited

U.S. PATENT DOCUMENTS

| | | | | |
|---|---|---|---|---|
| 2002/0171246 A1* | 11/2002 | Dietz | ...................... | B60K 6/26 290/40 C |
| 2011/0074326 A1* | 3/2011 | Su | ............................. | H02P 5/74 318/400.27 |
| 2012/0126758 A1* | 5/2012 | Fang | ........................ | H02P 9/48 322/29 |
| 2013/0234678 A1* | 9/2013 | Patterson | ................ | H02P 9/302 322/28 |
| 2015/0311719 A1* | 10/2015 | Andresen | .................. | H02J 3/36 307/82 |

FOREIGN PATENT DOCUMENTS

| | | |
|---|---|---|
| CN | 102222929 A | 10/2011 |
| CN | 102983586 A | 3/2013 |
| EP | 1787383 A1 | 3/2006 |

* cited by examiner

*Primary Examiner* — Adolf Berhane
*Assistant Examiner* — Nusrat Quddus
(74) *Attorney, Agent, or Firm* — Beusse Wolter Sanks & Maire (57) ABSTRACT

A device for connecting an electric power generator to an HVDC transmission system is provided, the device having (a) a first unit for converting an AC output voltage from the electric power generator to a DC input voltage for the HVDC transmission system, the first unit having a transformer and a full-bridge rectifier, and (b) a second unit for generating control voltages and/or control currents in the transformer and/or in the electric power generator, the second unit having a PWM full-bridge converter adapted to receive the AC output voltage from the electric power generator or an AC voltage based on said AC output voltage. Furthermore, a system and a method are provided.

15 Claims, 4 Drawing Sheets

FIG 7

DEVICE AND METHOD FOR CONNECTING AN ELECTRIC POWER GENERATOR TO AN HVDC TRANSMISSION SYSTEM

CROSS REFERENCE TO RELATED APPLICATIONS

This application claims the benefit of European Application No. EP14170792 filed Jun. 2, 2014, incorporated by reference herein in its entirety.

FIELD OF INVENTION

The present invention relates to the field of electrical power production, in particular to devices and methods for connecting electric power generators to an HVDC transmission system.

ART BACKGROUND

With the development of large offshore wind farms for producing electric energy, transmission losses occurring along transmission lines between a wind farm and a connection to a distribution grid on land may become significant.

In such cases, HVDC (high-voltage, direct current) technology has distinct advantages in terms of low losses in comparison to the common AC (alternating current) technologies. In particular, by using a high voltage (up to e.g. 800 kV), the current flowing in the transmission lines—and thereby the resistive losses—is significantly reduced when a given amount of power is transmitted. Thus, in terms of losses, HVDC is advantageous for long distance power transmission and may be considered as being ideal for offshore wind power applications. The use of fewer number of wires for transmission also means reduction in costs.

However, in order to handle the high voltage and high power in the HVDC transmission, especially under increasingly stringent performance requirements, some sophisticated power converter systems have to be applied, which can be technically challenging and often means high cost.

In known implementations, the AC output of a grid converter of a wind turbine is connected to a step-up transformer, and then converted to HVDC through a converter. Two of the common converter topologies are line-commutated current source Thyristor converters and IGBT based voltage source converters (VSCs).

Thyristor converter systems have been the dominant technique for HVDC transmission, which can use voltages as high as 800 kV. In this converter type, the firing angle is used for control of the DC voltage and the power flow. It consumes reactive power and the AC currents contain low-frequency harmonics. Thus, phase compensation is normally used to improve the power factor, and large filters are required to reduce the current distortion.

The HVDC transmission with VSC technique has the advantages of high control bandwidth and low current harmonic distortion, and thus low requirements on the line filters. This kind of system is in fast progress, and two examples are Siemens HVDC Plus and ABB HVDC Light. Both systems employ multilevel converter techniques in order to accommodate low voltage rated power components (e.g., IGBT) and relatively low switching operations, and hence the systems tend to be relatively more technically challenging and more expensive.

There may be a need for a simple and cost-effective way of connecting an electrical power generator to an HVDC transmission system.

SUMMARY OF THE INVENTION

This need may be met by the subject matter according to the independent claims. Advantageous embodiments of the present invention are described by the dependent claims.

According to a first aspect of the invention there is provided a device for connecting an electric power generator to an HVDC transmission system. The device comprises (a) a first unit for converting an AC output voltage from the electric power generator to a DC input voltage for the HVDC transmission system, the first unit comprising a transformer and a full-bridge rectifier, and (b) a second unit for generating control voltages and/or control currents in the transformer and/or in the electric power generator, the second unit comprising a PWM full-bridge converter adapted to receive the AC output voltage from the electric power generator or an AC voltage based on said AC output voltage.

This aspect of the invention is based on the idea that the connection between the electric power generator and the HVDC transmission system is split up in a first path (formed by the first unit) and a second path (formed by the second unit). The first path serves to convert the AC output voltage from the electric power generator to a suitable DC input voltage for the HVDC transmission system, i.e. the first unit comprises a transformer for increasing the AC voltage and a full-bridge rectifier that rectifies the increased AC voltage level to the DC input voltage for the HVDC transmission system. Thus, the first unit handles the actual (or main) transmission of electric power from the electric power generator into the HVDC transmission system. The second path serves to generate control/voltages and/or control currents, i.e. the second unit comprises a PWM full-bridge converter that is dedicated to performing control and correction functions rather than power transmission. In other words, the power transmission is handled by the simple and cost-effective full-bridge rectifier of the first unit, while control and correction functions are handled by a PWM full-bridge converter. As the PWM full-bridge converter of the second unit will not have to handle the same level of power as the full-bridge rectifier of the first unit, the PWM full-bridge converter of the second unit does not need to be nearly as complex (and thus expensive) as a PWM full-bridge converter designed to handle both power transmission and control functions. Accordingly, the device according to this aspect of the present invention provides a simple and cost-effective way of the feeding power from an electric power generator, such as an offshore wind turbine or wind farm, into a HVDC transmission system.

In the present context, the term "full-bridge rectifier" may in particular denote a rectifier utilizing passive components, while the term "PWM full-bridge converter" in particular may denote a converter utilizing active components.

The PWM full-bridge converter of the second unit is adapted to receive the AC output voltage from the electric power generator or an AC voltage based on (or derived from) the AC output voltage from the electric power generator. In the latter case, the PWM full-bridge converter may e.g. receive the AC voltage via a transformer that raises the voltage compared to the AC output voltage from the electric power generator.

According to an embodiment of the invention, the transformer comprises (a) a set of primary windings for receiving the AC output voltage from the electric power generator, (b) a first set of secondary windings coupled to an input of the full-bridge rectifier of the first unit, and (c) a second set of secondary windings coupled to an input of the PWM full-bridge converter of the second unit.

The relation between the number of turns in the first set of secondary windings and the number of turns in the set of primary windings is chosen in view of the AC output voltage from the electric power generator such that the rectified DC output voltage of the full-bridge rectifier of the first unit corresponds to the required DC input voltage of the HVDC transmission system, e.g. such that a 690 V AC output voltage is converted to an 800 kV DC voltage.

Similarly, the relation between the number of turns in the second set of secondary windings and the number of turns in the set of primary windings is chosen in view of the AC output voltage from the electric power generator and the DC voltage at the output of the PWM full-bridge converter.

The number of turns in the second set of secondary windings may be equal to or less than the number of turns in the first set of secondary windings.

The AC output voltage from the electric power generator may advantageously be a 3-phase AC voltage. In this case, each of the set of primary windings, the first set of secondary windings and the second set of secondary windings may advantageously comprise 3 windings, i.e. one winding per phase.

In this embodiment, the two (i.e. first and second) sets of secondary windings of the transformer splits the output power from the electric power generator into a first part that is provided to the first unit and into a second part that is provided to the second unit.

Accordingly, this embodiment differs from a conventional HVDC connection device in that the transformer is provided with a second set of secondary windings sharing the same core as the first set of secondary windings, and in that the second set of secondary windings are coupled to a converter that is dedicated to generating control voltages and/or control currents in the transformer, e.g. for harmonic control, efficiency control, HVDC voltage regulation etc.

Thus, the present embodiment is easy to implement in existing systems without modification of the electric power generator.

According to a further embodiment of the invention, the electric power generator comprises a generator unit having a stator and a rotatably supported rotor, the stator comprising a first set of windings and a second set of windings, the rotor being adapted to induce electrical voltage in the first set of windings and in the second set of windings when the rotor is rotated relative to the stator. Furthermore, the set of primary windings of the transformer of the first unit is coupled to the first set of windings of the stator, and the second unit comprises a further PWM full-bridge converter having an input coupled to the second set of windings of the stator.

In other words, in the device according to this embodiment, the second unit comprises two PWM full-bridge converters, i.e. converter one coupled to the second set of secondary windings of the transformer of the first unit as described above, and a further converter coupled to the second set of windings of the stator.

In this embodiment, the further PWM full-bridge converter may in particular be dedicated to generation of control voltages and/or control currents for the generator unit, i.e. to perform control and regulation functions relating to the output from the generator unit, while the other (i.e. the first) PWM full-bridge converter (i.e. the one coupled to the second set of secondary windings of the transformer of the first unit) may be dedicated to generation of control voltages and/or control currents for the transformer as described above.

By using two separate PWM full-bridge converters, one for controlling the generator unit and one for controlling the transformer, the control may be optimized and each of the two converters may be designed to handle even less power than in the above described embodiment with a single PWM full-bridge converter. Furthermore, as the output voltage to the full-bridge rectifier of the first unit can be regulated by use of both PWM converters (i.e. in the generator and transformer), the HVDC may be better matched across multiple generators, such as multiple wind turbines in a wind farm.

The generator unit may be a permanent magnet machine, an externally excited synchronous machine, an induction machine, a switched reluctance machine, etc. In particular, the generator unit may be a permanent magnet machine for a direct drive wind turbine.

According to a further embodiment of the invention, the electric power generator comprises a selectable frequency grid converter for providing the AC output voltage.

Thereby, instead of the conventional frequency of 50 Hz or 60 Hz for operation in the grid connection, an alternative frequency (e.g., 30 Hz or 70 Hz) can be selected. For example, as the AC power will be fairly local, and the impedance and losses for long distance transmission are not much of a concern, a higher frequency may be more suitable within a wind farm. The flexibility in selection of the frequency may provide some benefits in terms of cost, size and performance of the system.

According to a further embodiment of the invention, the electric power generator comprises a generator unit having a stator and a rotatably supported rotor, the stator comprising a first set of windings and a second set of windings, the rotor being adapted to induce electrical voltage in the first set of windings and in the second set of windings when the rotor is rotated relative to the stator. The transformer of the first unit comprises: (a) a set of primary windings coupled to the first set of windings of the stator in order to receive the AC output voltage from the electric power generator, and (b) a set of secondary windings coupled to an input of the full-bridge rectifier of the first unit. Furthermore, an input of the PWM full-bridge converter of the second unit is coupled to the second set of windings of the stator.

In this embodiment, the input of the PWM full-bridge converter of the second unit is coupled to the second set of windings of the stator. Thus, in comparison to the embodiment described above, the transformer of the first unit does not have to have a second set of secondary windings. However, the general idea remains the same: The PWM full-bridge converter of the second unit is responsible for generating control voltages and/or control currents while the full-bridge rectifier of the first unit is responsible for the actual transmission of power to the HVDC transmission system. However, apart from the advantages described with regard to the above described embodiment, this arrangement or topology may be less costly and more efficient. A line filter may have to be used for suppression of harmonics generated by the full-bridge rectifier of the first unit. Furthermore, the transformer may have to be somewhat oversized due to the relatively low operating frequencies.

It should also be noted, that in all embodiments where the generator unit comprises two sets (a first set and a second set) of stator windings, the PWM full-bridge converter of the second unit may be used to perform a wide variety of control functions, such as (a) a sensorless field orientated vector control, (b) Id current control for field weakening or field strengthening in the stator, (c) DC output voltage regulation (either directly or through field control), (d) active and reactive power control (either directly or through field control), (e) harmonic current control to compensate for the harmonics produced from the rectifier commutations, (f) torque ripple or vibration control by injection of harmonic currents, (g) cogging torque control, (h) generator power factor control or efficiency control by field regulation in the second system, and (i) various other control functions, such as drive-train damping control and support for grid fault conditions.

According to a further embodiment of the invention, an output of the PWM full-bridge converter is coupled to the HVDC transmission system or to a DC voltage system having a lower DC voltage than the HVDC transmission system.

In the first case, where the output of the PWM full-bridge converter is coupled to the HVDC transmission system, the converter is designed to provide the same DC output voltage as the full-bridge rectifier of the first unit.

In the second case, where the output of the PWM full-bridge converter is coupled to a DC voltage system having a lower DC voltage than the HVDC transmission system, the converter is designed to provide a corresponding DC output voltage. The DC voltage system may be provided as a voltage divider connected to the HVDC transmission system or as a separate DC voltage system, such as a rectified LVDC (low-voltage DC) from the low voltage side of a wind turbine system, or a dedicated low voltage generator (e.g, gas turbine(s)).

According to a further embodiment of the invention, the control voltages and/or control currents generated by the second unit are adapted for at least one of DC output voltage regulation, active and reactive power control, and harmonic current control.

According to a further embodiment of the invention, the full-bridge rectifier of the first unit is a full-bridge thyristor or diode rectifier and/or the PWM full-bridge converter of the second unit is a voltage source full-bridge type converter.

Thereby, the full-bridge rectifier, which is dedicated to transmitting power into the HVDC transmission system, can be made of simple, reliable and relatively inexpensive passive components, while the PWM full-bridge type converter, which is dedicated to generating control voltages and/or control currents, can be made of active semiconductor components, such as e.g. IGBTs, that do not need the capability of handling the large amount of power transmitted to the HVDC transmission system but only the power concerned with the relevant control functions.

According to a second aspect of the invention, there is provided a system for producing electric power and feeding it to an HVDC transmission system, the system comprising (a) an electric power generator, and (b) a device according to the first aspect or any of the above embodiments.

This aspect of the invention is based on substantially the same idea as the first aspect described above. More specifically, this aspect of the invention relates to a system for producing electric power with the ability of feeding said power to an HVDC transmissions system by means of a device according to the first aspect or any of the above embodiments.

According to a further embodiment of the invention, the electric power generator comprises a wind turbine.

In particular, the system may be constituted by an offshore wind farm comprising a plurality of wind turbines.

According to a third aspect of the invention there is provided a method of connecting an electric power generator to an HVDC transmission system, the method comprising (a) providing a first unit for converting an AC output voltage from the electric power generator to a DC input voltage for the HVDC transmission system, the first unit comprising a transformer and a full-bridge rectifier, and (b) providing a second unit for generating control voltages and/or control currents in the transformer and/or in the electric power generator, the second unit comprising a PWM full-bridge converter adapted to receive the AC output voltage from the electric power generator or an AC voltage based on said AC output voltage.

This aspect of the invention is based on substantially the same idea as the first aspect described above.

Generally, in embodiments of the present invention, the power flow in an HVDC system may be separated into two paths: one with high voltage and one with low voltage. The high voltage and high power will be handled by simple converters, such as Thyristor or diode based rectifiers (mostly passive), and the low voltage and low power path is mainly composed of voltage source converters (VSC) for active control, such as reactive power compensation and HVDC voltage balancing, etc. Associated with the active control path, auxiliary windings are included in the generator and/or the transformer. As discussed above, such an HVDC system is less expensive and more reliable, whilst the performance for each individual wind turbine and their HVDC bus interconnection is retained.

Or stated otherwise: This invention aims at creating an alternative HVDC topology. The core of the new topology is to allow the main power to flow through passive or low switching HVDC/MVDC converter system, while keeping the converters for active control at low voltage levels. Hence, in the high voltage path, simple power components (such as Thyristors or diodes) can be used, where the technology is relatively matured, and the resultant converter will be more reliable and energy efficient, but less expensive. The auxiliary parts are operated at low voltage for active control of power flow, as well as some critical functions such as voltage balancing across generators (e.g. wind turbines).

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

DETAILED DESCRIPTION

The illustration in the drawing is schematic. It is noted that in different figures, similar or identical elements are provided with the same reference numerals or with reference numerals which differ only within the first digit.

Figure 1:
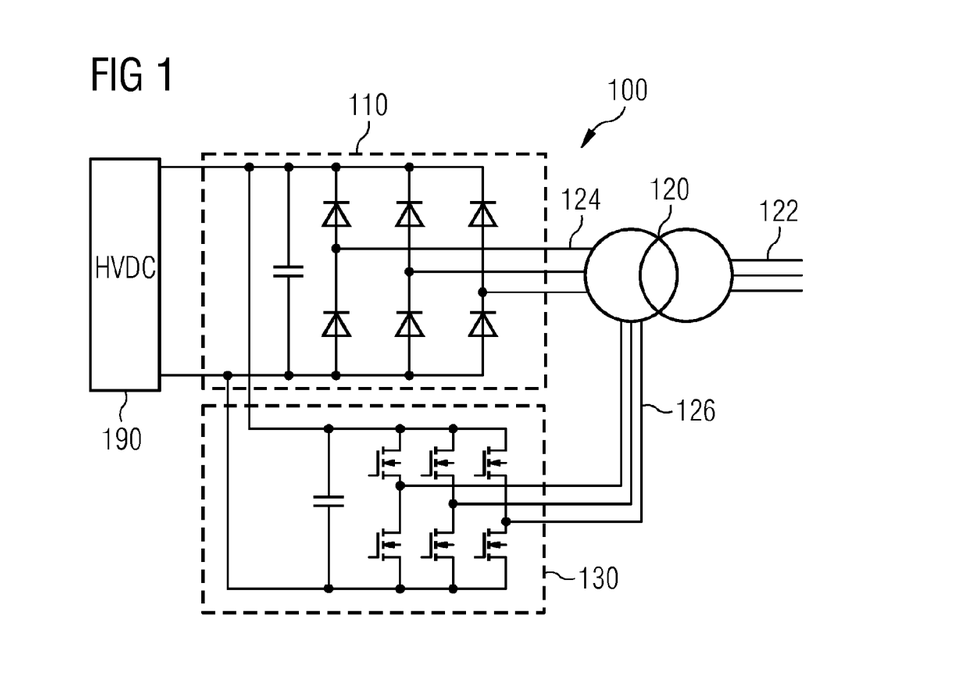
FIG. 1 shows a device according to an embodiment of the present invention.

FIG. 1 shows a device 100 according to an embodiment of the present invention. The device 100 comprises a full-bridge rectifier 110, a step-up transformer 120, and a PWM full-bridge converter 130. The full-bridge rectifier 110 comprises six diodes (or thyristors) arranged to rectify a 3-phase AC input into an output DC voltage. The PWM full-bridge converter 130 is an active converter comprising semiconductor switching components (e.g. IGBTs) and a control circuit (not shown) for converting a 3-phase AC input into an output DC voltage while generating control currents and/or control voltages in the transformer 120. The transformer 120 comprises a set of 3 primary windings that is connectable to a 3-phase AC output from a generator, such as one or more wind turbines, via wires 122. The transformer 120 further comprises a first set of 3 secondary windings connected to the input of the rectifier 110 via wires 124 and a second set of 3 secondary windings connected to the input of the converter 130 via wires 126. In this embodiment, the two sets of secondary windings of the transformer 120 comprise slightly different numbers of turns, such that the rectifier 110 receives a slightly higher AC voltage than the converter 130. The rectifier 110 and converter 130 provide substantially the same DC voltage at their respective outputs. The output of the rectifier 110 and the output of the converter 130 are connected in parallel to an input of a HVDC transmission system 190.

In operation, the step-up transformer 120 receives a 3-phase AC voltage (e.g. 690 V) from a generator (e.g. one or more wind turbines) via wires 122 and transforms it to substantially higher voltage levels for input to the rectifier 110 via wires 124 and to the converter 130 via wires 126. The rectifier 110 provides a corresponding rectified DC output voltage (e.g. 800 kV) and feeds it to the HVDC transmission system 190. At the same time, the converter 130 generates control currents and/or control voltages in the transformer 120 in order to perform control functions, such as active control of power flow, voltage balancing across generators (e.g. wind turbines), generation of active/reactive power, output voltage regulation, etc. Thereby, the rectifier 110 handles the actual transmission of power to the HVDC transmission system 190, while the converter 130 handles the generation of control currents and/or control voltages. Accordingly, the converter 130 must not handle the large power levels that are handled by the rectifier 110 and can thus be designed with relatively cheap components in comparison to a stand-alone active converter designed to handle both actual power transmission and control functions.

Figure 2:
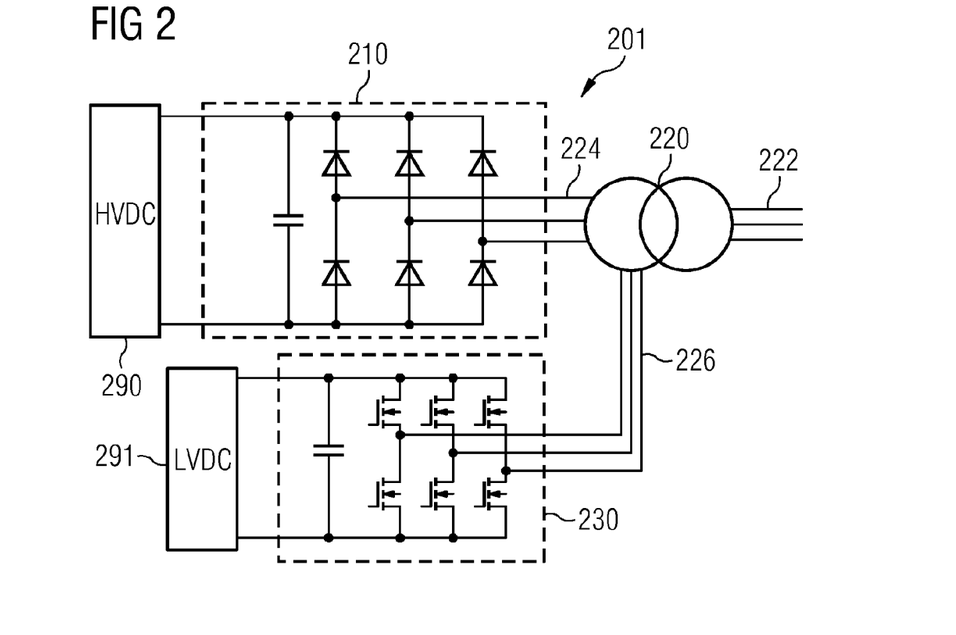
FIG. 2 shows a device according to a further embodiment of the present invention.

FIG. 2 shows a device 201 according to a further embodiment of the present invention. The overall structure and function of the device 201 is similar to that of the device 100 which is shown in FIG. 1 and described above. However, the device 201 differs from device 100 in that the output from rectifier 210 and converter 230 are not connected in parallel. Instead, the output from rectifier 210 is connected to HVDC transmission system 290 while the output from converter 230 is connected to a LVDC system 291 having a significantly lower voltage (e.g. 1100V) than the HVDC system 290. The LVDC system 291 may be a separate system, such as a rectified DC voltage from the low voltage side of a wind turbine system or a dedicated low voltage generator (such as a gas turbine) or linked to the HVDC system 290, i.e. a split HVDC. Accordingly, the converter 230 is designed to operate at correspondingly lower voltages and the number of turns in the second set of secondary windings of transformer 220 is chosen accordingly. Thereby, the converter 230 can be realized with even cheaper components than the converter 130, as it does not need to handle the high voltages.

Figure 3:
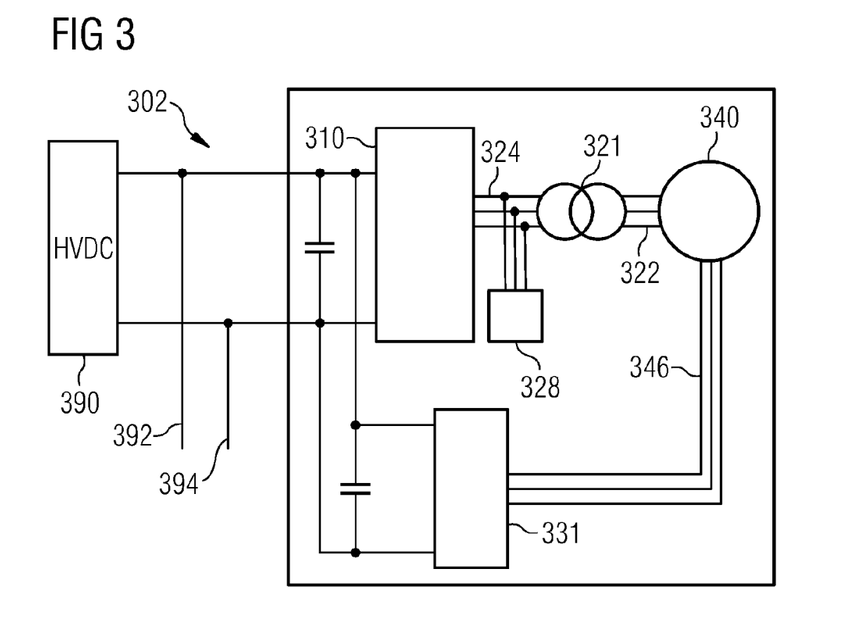
FIG. 3 shows a system including a generator and a device according to a further embodiment of the present invention.

FIG. 3 shows a system 302 including a generator 340 and a device according to a further embodiment of the present invention. Like in the embodiments described above, the device comprises a full-bridge rectifier 310, a step-up transformer 321, and a PWM full-bridge converter 330. However, in this embodiment, the transformer 321 comprises only one set of secondary windings which are connected to the input of rectifier 310 via wires 324. A line filter 328 is arranged between the transformer 321 and rectifier 310 in order to suppress harmonics. The generator 340, e.g. a wind turbine, comprises a stator and a rotor. The stator comprises two sets (a first set and a second set) of stator windings. The primary side of the transformer 321 is connected to the first set of stator windings via wires 322 and the second set of stator windings is connected to the input of converter 331 via wires 346. Like in FIG. 1, the output of the rectifier 310 and the output of the converter 331 are connected in parallel to an input of a HVDC transmission system 390. Further similar devices and generators 340 can be connected to the HVDC transmission system via wires 392 and 394.

In general, the working principle and advantages of this embodiment are similar to those of the embodiment shown in FIG. 1. However, the converter 331 in this embodiment is connected to a second set of stator windings (instead of a second set of transformer secondary windings as in FIG. 1). Accordingly, the converter 331 generates control currents and/or control voltages in the second set of stator windings, such that the control system (not shown) of the converter 331 has to be designed accordingly. In particular, the suppression of harmonics is handled by the line filter 328 in this embodiment, as the active converter 321 cannot influence the transformer 321 in this embodiment.

Figure 4:
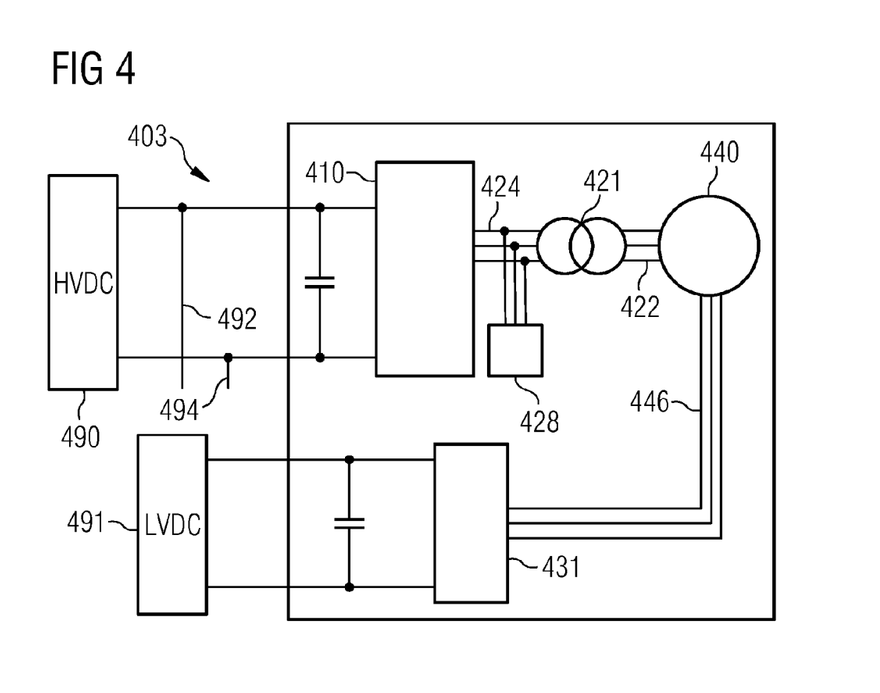
FIG. 4 shows a system including a generator and a device according to a further embodiment of the present invention.

FIG. 4 shows a system 403 including a generator 440 and a device according to a further embodiment of the present invention. The overall structure and function of this embodiment is similar to that of the embodiment shown in FIG. 3 and described above. However, in this embodiment, the output from rectifier 410 is connected to HVDC transmission system 490 while the output from converter 431 is connected to a LVDC system 491 having a significantly lower voltage than the HVDC system 490. The LVDC system 491 may be a separate system, such as a rectified DC voltage from the low voltage side of a wind turbine system or a dedicated low voltage generator (such as a gas turbine)

or linked to the HVDC system 490, i.e. a split HVDC. Accordingly, the converter 431 is designed to operate at correspondingly lower voltages and the second set of stator windings is designed accordingly.

Figure 5:
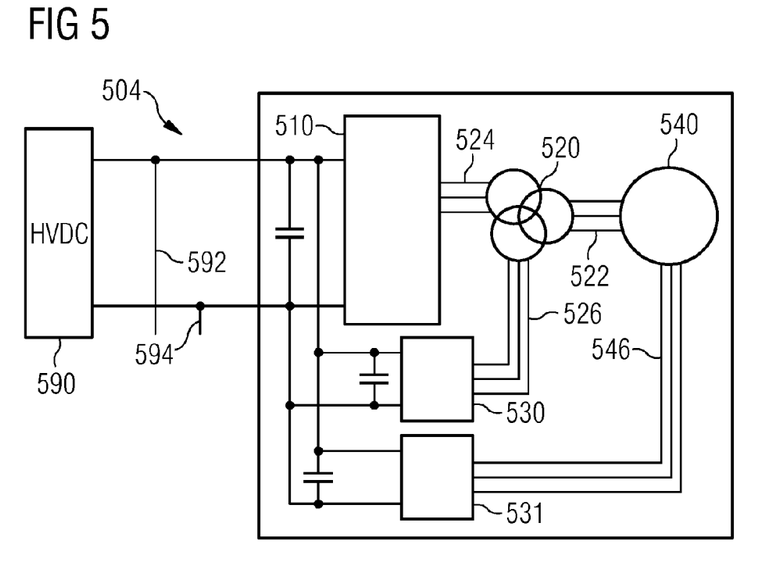
FIG. 5 shows a system including a generator and a device according to a further embodiment of the present invention.

FIG. 5 shows a system 504 including a generator 540 and a device according to a further embodiment of the present invention. More specifically, this embodiment is a combination of the embodiments shown in FIGS. 1 and 3. That is, the transformer 520 comprises two sets of secondary windings: one connected to the input of rectifier 510 via wires 524 and one connected to the input of a first PWM full-bridge converter 530 via wires 526. Furthermore, the generator 540 comprises two sets of stator windings: one connected to the primary set of windings of transformer 520 via wires 522 and one connected to the input of a second converter 531. The outputs of rectifier 530 and the two converters 530, 531 are connected in parallel to the input of HVDC transmission system 590.

In this embodiment, the first converter 530 corresponds (in design and function) to the converter 130 shown in FIG. 1 and the second converter 531 similarly corresponds to the converter 331 shown in FIG. 3. That is, in this embodiment no line filter (corresponding to line filter 328, 428) is necessary, as the first converter 530 can handle the suppression of harmonics generated by the rectifier 510.

Figure 6:
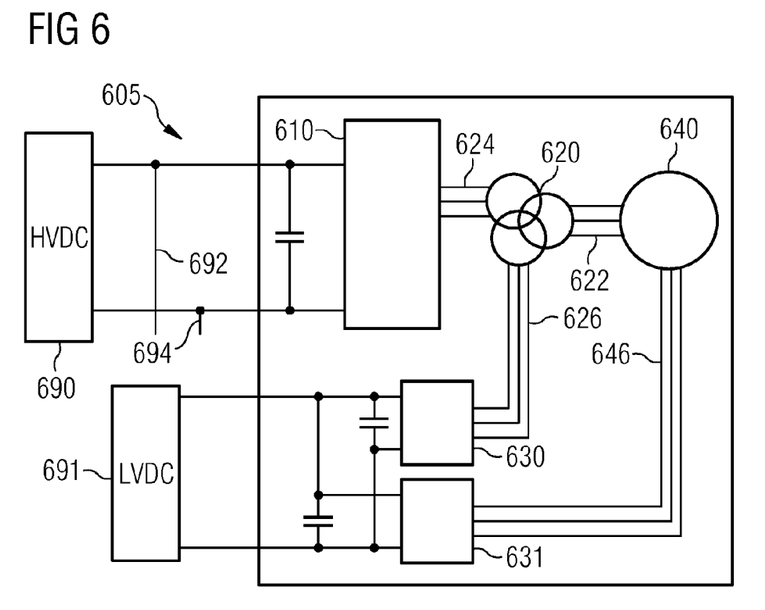
FIG. 6 shows a system including a generator and a device according to a further embodiment of the present invention.

FIG. 6 shows a system 605 including a generator and a device according to a further embodiment of the present invention. More specifically, this embodiment is a combination of the embodiments shown in FIGS. 2 and 4. Accordingly, the overall structure and function of this embodiment is similar to that of the embodiment shown in FIG. 5 and described above. However, in this embodiment, the output from rectifier 610 is connected to HVDC transmission system 690 while the outputs from the first converter 630 and second converter 631 are connected in parallel to a LVDC system 691 having a significantly lower voltage than the HVDC system 690. Like in the embodiments of FIGS. 2 and 4, the LVDC system 691 may be a separate system or linked to the HVDC system 690. Accordingly, the converters 630 and 631 are designed to operate at correspondingly lower voltages and lower power, and the second sets of secondary windings and stator windings are designed accordingly.

Figure 7:
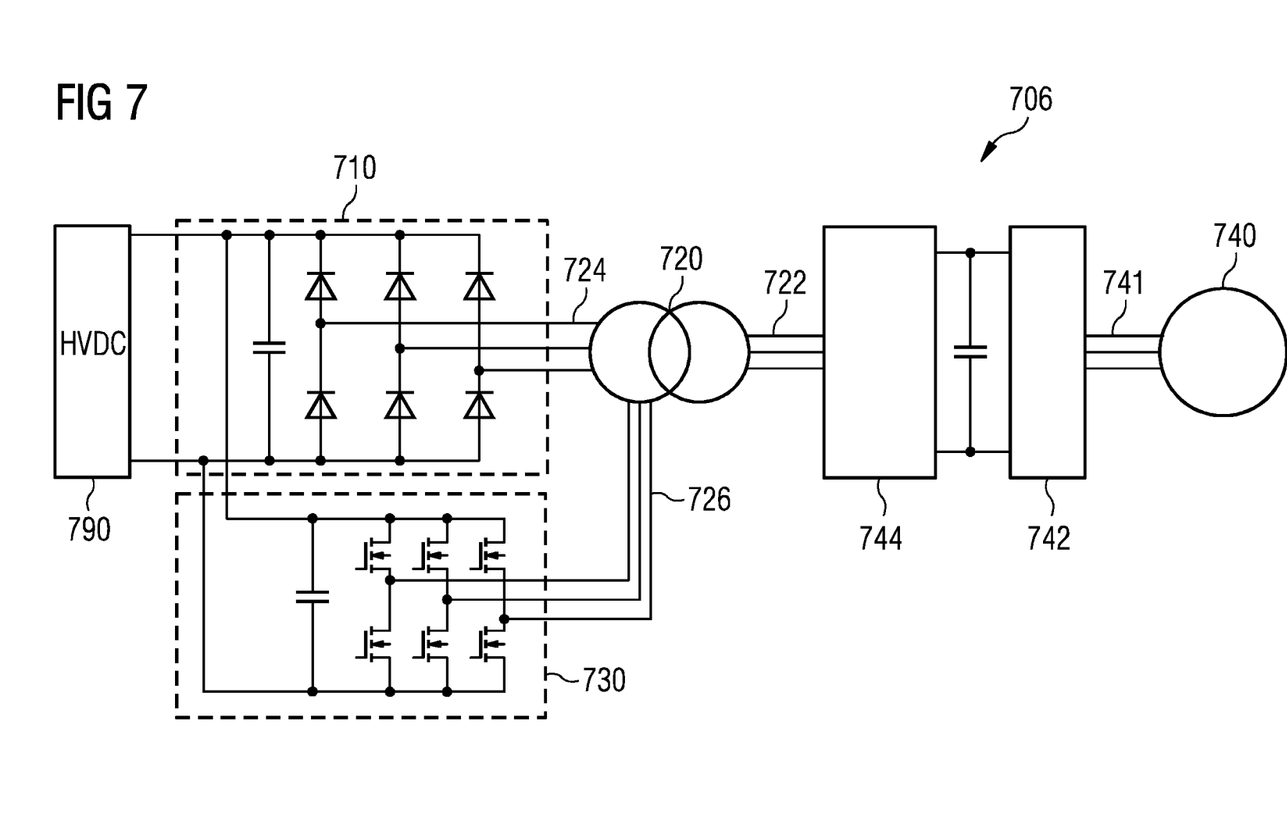
FIG. 7 shows a system including a generator and a device according to a further embodiment of the present invention.

FIG. 7 shows a system including a generator 740 and a device according to a further embodiment of the present invention. This embodiment corresponds to the embodiment of FIG. 1 with some additional features on the generator side. More specifically, the AC output from generator 740 is fed to generator converter 742 via wires 741. The resulting DC output from generator converter 742 is input to a selectable frequency grid converter 744 which provides a 3-phase AC output with a selected frequency to the primary side of transformer 720. Rectifier 710, transformer 720 and converter 730 correspond to rectifier 110, transformer 120 and converter 130 shown in FIG. 1 and described in detail above.

In this embodiment, instead of the conventional frequency of 50 Hz or 60 Hz for operation in the grid connection, an alternative frequency (e.g., 30 Hz or 70 Hz) can be selected in the HVDC power transmission system. For example, as the AC power will be fairly local, and the impedance and losses for long distance transmission are not much of a concern, a higher frequency may be more suitable within a wind farm. The flexibility in selection of the frequency provides various benefits in terms of cost, size and performance of the system.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The invention claimed is:

1. A device for connecting an electric power generator to an HVDC transmission system, the device comprising:
   a first unit for converting an AC output voltage from the electric power generator to a DC input voltage for the HVDC transmission system, the first unit comprising a transformer and a full-bridge rectifier, and
   a second unit for generating control voltages and/or control currents in the transformer and/or in the electric power generator, the second unit comprising a PWM full-bridge converter adapted to receive the AC output voltage from the electric power generator or an AC voltage based on said AC output voltage,
   wherein the transformer of the first unit comprises a set of primary windings for receiving the AC output voltage from the electric power generator, a first set of secondary windings coupled to an input of the full-bridge rectifier of the first unit, and a second set of secondary windings coupled to an input of the PWM full-bridge converter of the second unit.

2. The device according to claim 1,
   wherein the electric power generator comprises a generator unit having a stator and a rotatably supported rotor, the stator comprising a first set of windings and a second set of windings, the rotor being adapted to induce electrical voltage in the first set of windings and in the second set of windings when the rotor is rotated relative to the stator,
   wherein the set of primary windings of the transformer of the first unit is coupled to the first set of windings of the stator, and
   wherein the second unit comprises a further PWM full-bridge converter having an input coupled to the second set of windings of the stator.

3. The device according to claim 1,
   wherein the electric power generator comprises a selectable frequency grid converter for providing the AC output voltage.

4. The device according to claim 1,
   wherein an output of the PWM full-bridge converter is coupled to the HVDC transmission system or to a DC voltage system having a lower DC voltage than the HVDC transmission system.

5. The device according to claim 1,
   wherein the control voltages and/or control currents generated by the second unit are adapted for at least one of DC output voltage regulation, active and reactive power control, and harmonic current control.

6. The device according to claim 1,
   wherein the full-bridge rectifier of the first unit is a full-bridge thyristor or diode rectifier and/or wherein the PWM full-bridge converter of the second unit is a voltage source full-bridge type converter.

7. A system for producing electric power and feeding it to an HVDC transmission system, the system comprising
   an electric power generator, and
   a device according to claim 1.

8. The system according to claim 7,
   wherein the electric power generator comprises a wind turbine.

9. A method of connecting an electric power generator to an HVDC transmission system, the method comprising:
converting an AC output voltage from the electric power generator to a DC input voltage for the HVDC transmission system via a first unit, the first unit comprising a transformer and a full-bridge rectifier, and
generating control voltages and/or control currents in the transformer and/or in the electric power generator via a second unit, the second unit comprising a PWM full-bridge converter adapted to receive the AC output voltage from the electric power generator or an AC voltage based on said AC output voltage,
wherein the transformer of the first unit comprises a set of primary windings for receiving the AC output voltage from the electric power generator, a first set of secondary windings coupled to an input of the full-bridge rectifier of the first unit, and a second set of secondary windings coupled to an input of the PWM full-bridge converter of the second unit.

10. The method according to claim 9,
wherein the electric power generator comprises a generator unit having a stator and a rotatably supported rotor, the stator comprising a first set of windings and a second set of windings, and further comprising:
inducing by the rotor an electrical voltage in the first set of windings and in the second set of windings when the rotor is rotated relative to the stator,
wherein the set of primary windings of the transformer of the first unit is coupled to the first set of windings of the stator, and
wherein the second unit comprises a further PWM full-bridge converter having an input coupled to the second set of windings of the stator.

11. The method according to claim 10,
wherein the electric power generator comprises a selectable frequency grid converter for providing the AC output voltage; and further comprising:
selecting a frequency of the frequency grid converter for providing the AC output voltage at the selected frequency.

12. The method according to claim 9, further comprising:
outputting an output of the PWM full-bridge converter to the HVDC transmission system or to a DC voltage system having a lower DC voltage than the HVDC transmission system.

13. The method according to claim 9, further comprising:
adapting the control voltages and/or control currents generated by the second unit for at least one of DC output voltage regulation, active and reactive power control, and harmonic current control.

14. The system according to claim 7,
wherein the electric power generator comprises a generator unit having a stator and a rotatably supported rotor, the stator comprising a first set of windings and a second set of windings, the rotor being adapted to induce electrical voltage in the first set of windings and in the second set of windings when the rotor is rotated relative to the stator.

15. The system according to claim 7,
wherein the electric power generator comprises a selectable frequency grid converter for providing an AC output voltage.

* * * * *